(12) United States Patent
Fox et al.

(10) Patent No.: US 11,461,586 B2
(45) Date of Patent: Oct. 4, 2022

(54) LEARNED INTERACTION WITH A VIRTUAL SCENARIO

(71) Applicant: INTERNATIONAL BUSINESS MACHINES CORPORATION, Armonk, NY (US)

(72) Inventors: Jeremy R. Fox, Georgetown, TX (US); Kelley Anders, East New Market, MD (US); Liam S. Harpur, Skerries (IE); Jonathan D. Dunne, Dungarvan (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 771 days.

(21) Appl. No.: 16/451,493

(22) Filed: Jun. 25, 2019

(65) Prior Publication Data
US 2020/0410286 A1    Dec. 31, 2020

(51) Int. Cl.
*G06K 9/62* (2022.01)
*G06N 20/00* (2019.01)
*G06T 19/00* (2011.01)

(52) U.S. Cl.
CPC ......... *G06K 9/6256* (2013.01); *G06K 9/6221* (2013.01); *G06N 20/00* (2019.01); *G06T 19/006* (2013.01)

(58) Field of Classification Search
CPC .... G06K 9/6256; G06K 9/6221; G06N 20/00; G06T 19/006
See application file for complete search history.

(56) References Cited

U.S. PATENT DOCUMENTS

| | | | |
|---|---|---|---|
| 5,679,004 A | 10/1997 | McGowan et al. |
| 5,823,789 A | 10/1998 | Easterbrook |
| 5,846,086 A | 12/1998 | Bizzi et al. |

(Continued)

FOREIGN PATENT DOCUMENTS

WO    2015080773 A1    6/2015

OTHER PUBLICATIONS

Ngobi, E., "The Impact of Augmented and Virtual Reality on Personalized Learning," [online] Raconteur, May 4, 2018, retreived from the Internet: <https://insights.samsung.com/2018/05/04/the-impact-of-augmented-and-virtual-reality-on-personalized-learning/>, Insights, Samsung © 1995-2019, 7 pg.

(Continued)

*Primary Examiner* — Mishawn N. Hunter
(74) *Attorney, Agent, or Firm* — Cuenot, Forsythe & Kim, LLC

(57) ABSTRACT

Providing learned interactions in a virtual reality or augmented reality (collectively, a computer-mediated reality) can include determining a probable physical action of a user interacting with a computer-mediated reality (CMR) environment. A learned interaction corresponding to the probable physical action can be generated based on a CMR-physical action (CMRPA) model that correlates physical actions with results of the physical actions in a CMR scenario of the CMR environment. In response to determining, based on at least one identified characteristic of the user, a statistical likelihood of benefiting the user by providing the learned interaction, a learned interaction corresponding to the probable physical action can be provided to the user.

20 Claims, 8 Drawing Sheets

(56) References Cited

U.S. PATENT DOCUMENTS

| | | | |
|---|---|---|---|
| 8,965,460 B1 | 2/2015 | Rao et al. | |
| 2012/0108909 A1 | 5/2012 | Slobounov et al. | |
| 2013/0342571 A1 | 12/2013 | Kinnebrew et al. | |
| 2014/0171039 A1 | 6/2014 | Bjontegard | |
| 2015/0091780 A1* | 4/2015 | Lyren | G02B 27/017 345/8 |
| 2018/0088677 A1* | 3/2018 | Zhang | G06T 19/006 |
| 2019/0012840 A1* | 1/2019 | Finman | G06T 19/006 |

OTHER PUBLICATIONS

"Augmented/Virtual Reality revenue forecast revised to hit $120 billion by 2020," [online] Jan. 13, 2016, Digi-Capital © 2018, retrieved from the Internet: <https://www.digi-capital.com/news/2016/01/augmentedvirtual-reality-revenue-forecast-revised-to-hit-120-billion-by-2020/>, 8 pg.

Cong, R. et al., "How It Works: Xbox Kinect," [online] Jameco © 2002-2019, retrieved from the Internet: <https://www.jameco.com/jameco/workshop/howitworks/xboxkinect.html>, 8 pg.

Karev, K., "Behold the Next Generation VR Technology: Part 4—Physical World Mapping," [online] Hacker Noon, Mar. 1, 2018, retrieved from the Internet: <https://hackernoon.com/behold-the-next-generation-vr-technology-part-4-physical-world-mapping-a16a6f3ad99d?gi=82aaf9a15ddf>, 7 pg.

Chua, P. et al., "Training for physical tasks in virtual environments: Tai Chi," IEEE Virtual Reality, 2003. Proceedings., Los Angeles, CA, USA, 2003, pp. 87-94.

Bailenson, J. et al., "The Effect of Interactivity on Learning Physical Actions in Virtual Reality," Media Psychology, vol. 11:, pp. 354-376, 2008.

Kyan, M. et al., "An Approach to Ballet Dance Training through MS Kinect and Visualization in a CAVE Virtual Reality Environment." ACM Trans. Intell. Syst. Technol., vol. 6, No. 2, Article 23 (Mar. 2015), 37 pages, 2015.

Eaves, D. "The Short-Term Effects of Real-Time Virtual Reality Feedback on Motor Learning in Dance," iN Presence Teleoperators & Virtual Environments, Feb. 2011, vol. 20, No. 1, pp. 62-77.

Todorov, E. et al., "Augmented Feedback Presented in a Virtual Environment Accelerates Learning of a Difficult Motor Task," In Journal of Motor Behavior, vol. 29, No. 2, 147-158, 1997.

* cited by examiner

LEARNED INTERACTION WITH A VIRTUAL SCENARIO

BACKGROUND

This disclosure relates to computer-based simulations, and more particularly, to computer-mediated environments characterizable as virtual reality (VR) and augmented reality (AR) environments.

Virtual reality is the computer-generated simulation of a three-dimensional image or environment that a computer user can interact with in a seemingly real or physical way by using specialized electronic equipment, such as a helmet with a screen inside or gloves fitted with sensors. Augmented reality creates an enhanced version of reality using computer-based technology to overlay digital information on real-world images of something viewed through a device such as a smartphone camera or similar type device. Although, often considered primarily in the context of entertainment, virtual reality and augmented reality find wide application in various other fields as well, including commerce, engineering, education, and medicine. Many observers predict continued increases in the number of users and the range of applications of virtual and augmented realities.

SUMMARY

In one or more embodiments, a method includes determining, using computer hardware, a probable physical action of a user interacting with a computer-mediated reality (CMR) environment hosted by a CMR system. The method can include generating, using the computer hardware, a learned interaction corresponding to the probable physical action based on a CMR-physical action (CMRPA) model that correlates physical actions with results of the physical actions in a CMR scenario of the CMR environment. The method also can include providing, using the computer hardware, a learned interaction corresponding to the probable physical action in response to determining, based on at least one identified characteristic of the user, a statistical likelihood of benefiting the user by providing the learned interaction.

In one or more embodiments, a system includes a processor configured to initiate operations. The operations can include determining a probable physical action of a user interacting with a CMR environment hosted by a CMR system. The operations also can include generating a learned interaction corresponding to the probable physical action based on a CMR-physical action (CMRPA) model that correlates physical actions with results of the physical actions in a CMR scenario of the CMR environment. The operations also can include providing a learned interaction corresponding to the probable physical action in response to determining, based on at least one identified characteristic of the user, a statistical likelihood of benefiting the user by providing the learned interaction.

In one or more embodiments, a computer program product includes a computer readable storage medium having program instructions stored thereon. The program instructions are executable by a processor to initiate operations. The operations can include determining, by the processor, a probable physical action of a user interacting with a CMR environment hosted by a CMR system. The operations also can include generating, by the processor, a learned interaction corresponding to the probable physical action based on a CMR-physical action (CMRPA) model that correlates physical actions with results of the physical actions in a CMR scenario of the CMR environment. The operations also can include providing, by the processor, a learned interaction corresponding to the probable physical action in response to determining, based on at least one identified characteristic of the user, a statistical likelihood of benefiting the user by providing the learned interaction.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
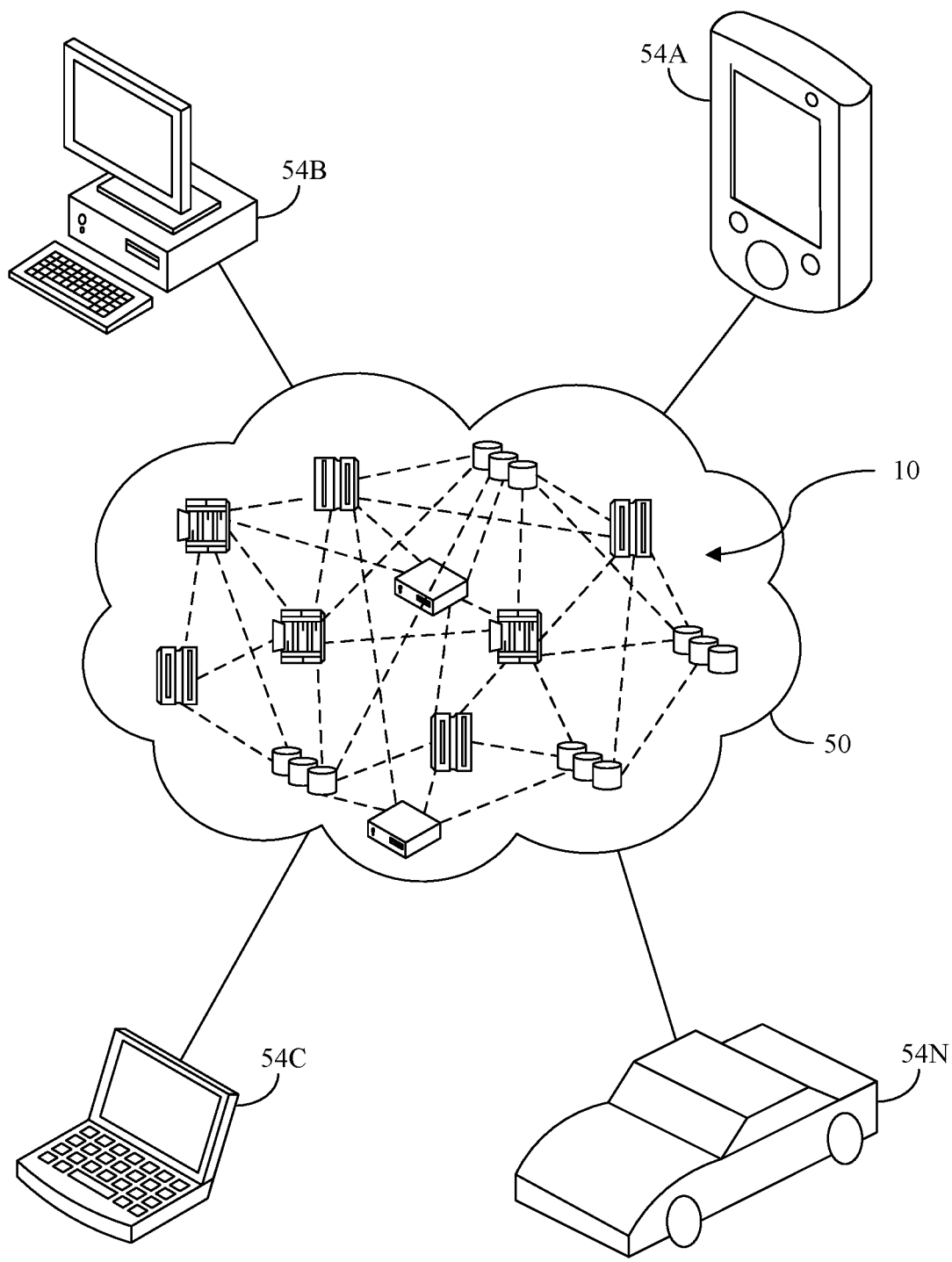
FIG. 1 depicts a cloud computing environment according to an embodiment of the present invention.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to computer-based simulations, and more particularly, to computer-mediated environments characterizable as virtual reality (VR) and augmented reality (AR) environments. ("Computer-mediated," as defined herein, encompasses VR, AR, and mixed-reality scenarios, environments, and systems.) One or more embodiments described within the disclosure relate to providing learned interactions to users interacting with computer-mediated reality (CMR) environments, including VR and AR environments. A learned interaction, depending on the context, refers to an augmented physical action or a physical action substitution corresponding to a probable physical action of a user interacting with a CMR environment. As defined herein, an "augmented physical action" is a computer-implemented presentation that informs a user how to more optimally perform a specific physical action (the "augmentation" of the physical action) within a CMR scenario that requires a physical action as input from the user. The computer-implemented presentation can include, for example, a written description, annotated images, video segment, and/or recorded audio that describe how to perform a specific physical action. As also defined herein, "physical action substitution" is a set of processor-executable instructions that generate a virtual physical action (the "substituted" version of the physical action) inserted into a CMR scenario in lieu of the user performing the physical action if, for whatever reason, the user cannot or will not perform the action but nonetheless wishes to continue interacting with the CMR environment. In either case, according to aspects of the inventive arrangements disclosed herein, a learned interaction is predicted to yield an optimal outcome (output) of a CMR scenario. One aspect in particular, is the crowd sourcing and implementation of specific skills (physical or other real-world) for performing actions specific to particular CMR scenario tasks.

A learned interaction corresponds to a physical action that, based on a model derived from the analysis of prior interactions with a CMR environment, is likely to provide an optimal outcome or result when performed by a user interacting with the same or a sufficiently similar CMR environment. Learned interactions not only increase the probability of an optimal experience for a user, but also enhance the functioning of a CMR system by mitigating the risk that user limitations, difficulties, or lack of experience will overburden system resources though unnecessary use.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

It is understood in advance that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
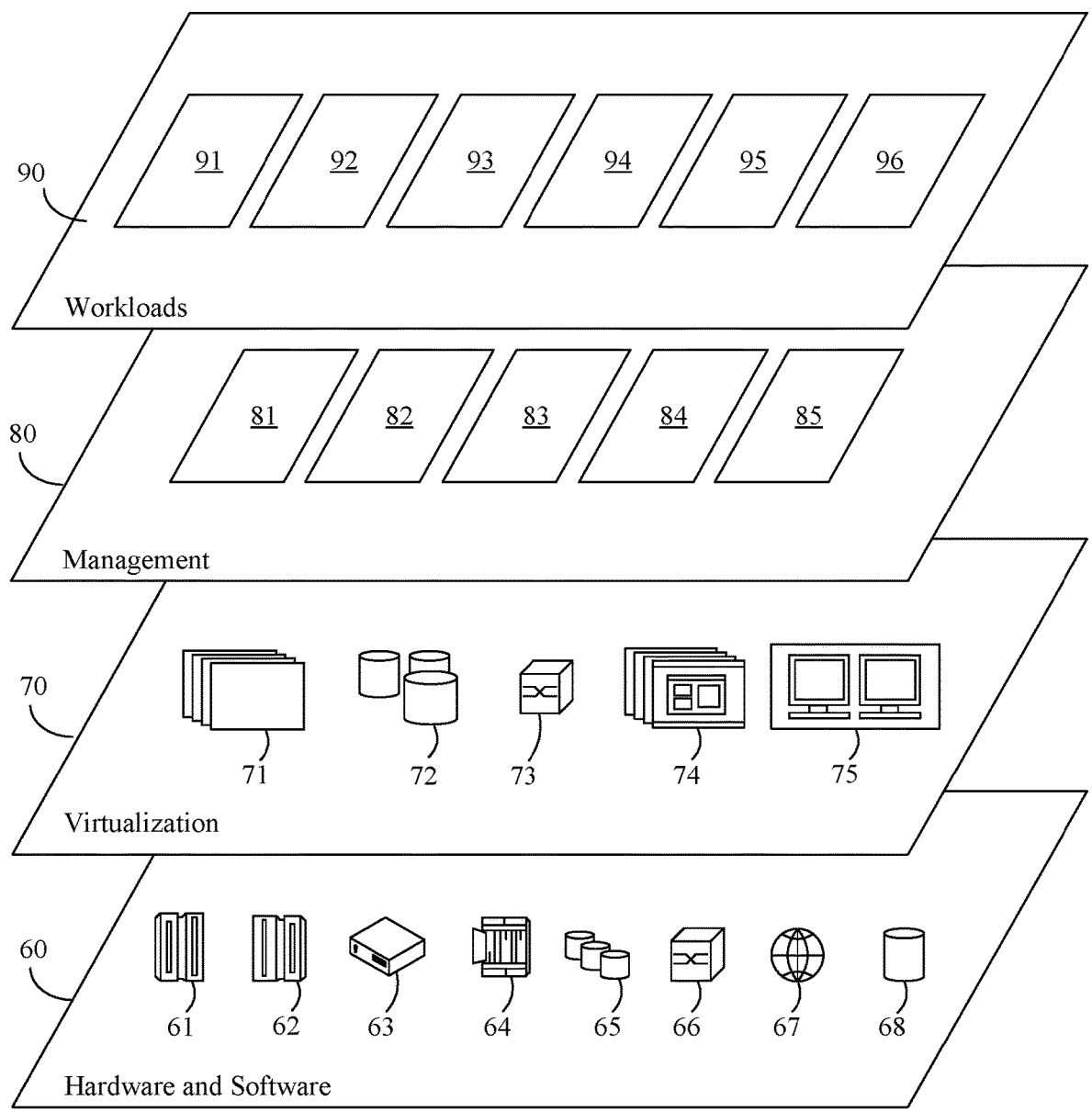
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing learned interactions 96.

In one or more embodiments, a system for providing learned interactions 96 is capable of deriving a CMR-physical action (CMRPA) model by analyzing physical-virtual interaction data. As derived, the CMRPA model can correlate specific physical actions performed (inputs) with CMR outcomes (outputs) generated in response to the physical actions of users interacting with CMR environments. Different users may perform differently in the same or similar CMR scenarios. One aspect of the CMRPA model is to determine physical actions that generate CMR environment outcomes that are optimal according to user-articulated standards. By determining a mode or manner of performing physical actions to generate optimal outcomes, the system can create and provide to users learned interactions that can guide users to adopt the same manner or mode of performing a physical action within a CMR scenario or that can substitute for users' physical actions. A learned interaction substitution can assist a user physically incapable of performing a particular physical action, for example.

One inventive aspect of the system is the derivation of the CMRPA model using collected physical-virtual interaction data collected from CMR system users. Using the model, a system for providing learned interactions 96 can leverage specific users' skills and learning, which can be shared with other users to enhance other users' experiences interacting with various CMR environments. The CMRPA model also can identify user constraints (e.g., physical limitations) and determine which physical acts are performable by such users. For a specific user (or group of users) having an identified constraint, a learned interaction tailored to such users can be created by the system. Further features of a system for providing learned interactions 96 are described below in greater detail.

Figure 3:
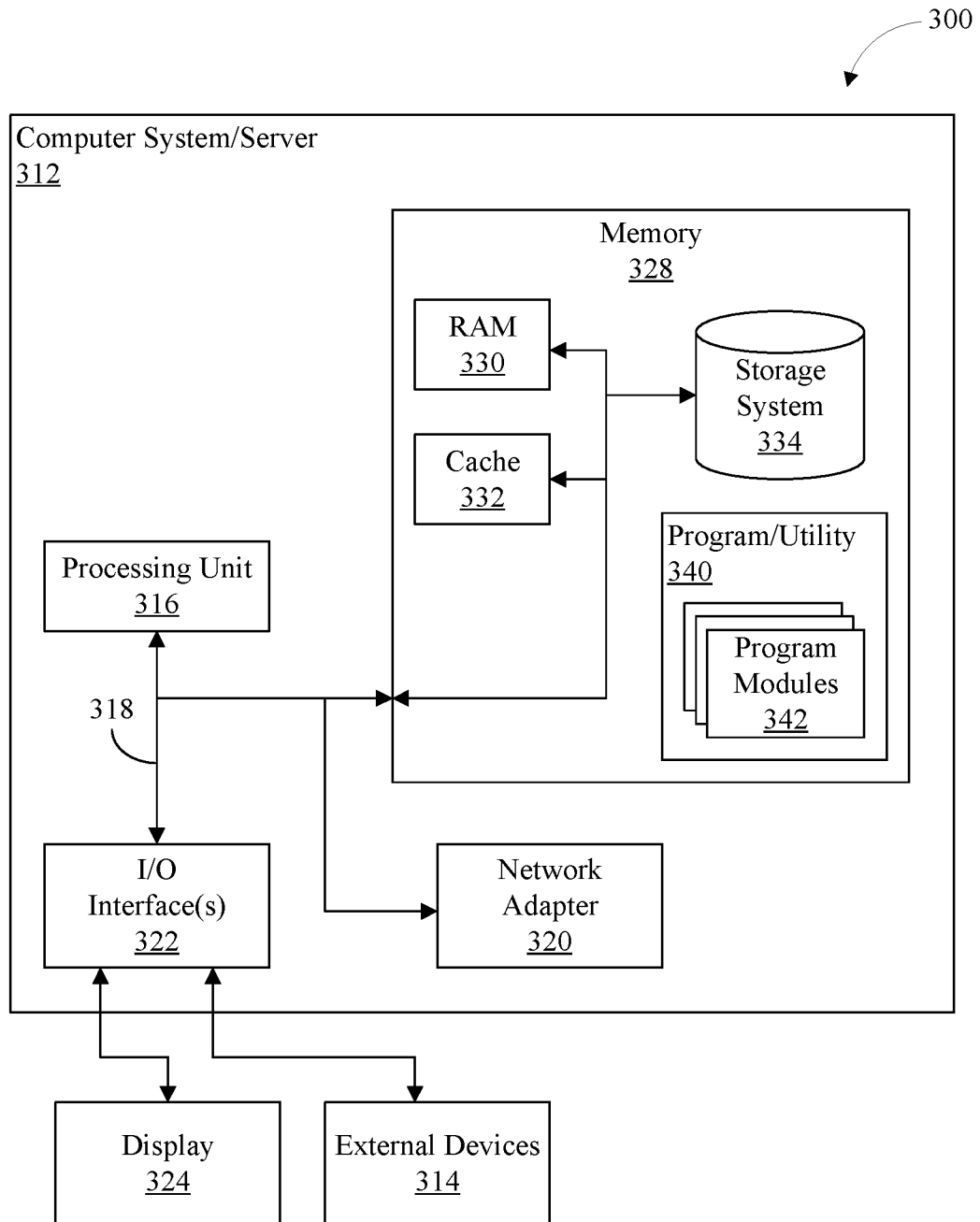
FIG. 3 depicts a cloud computing node according to an embodiment of the present invention.

FIG. 3 illustrates a schematic of an example of a computing node 300. In one or more embodiments, computing node 300 is an example of a suitable cloud computing node. Computing node 300 is not intended to suggest any limitation as to the scope of use or functionality of embodiments of the invention described herein. Computing node 300 is capable of performing any of the functionality described within this disclosure.

Computing node 300 includes a computer system 312, which is operational with numerous other general purpose or special purpose computing system environments or configurations. Examples of well-known computing systems, environments, and/or configurations that may be suitable for use with computer system 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 312 may be described in the general context of computer system-executable instructions, such as program modules, being executed by a computer system. Generally, program modules may include routines, programs, objects, components, logic, data structures, and so on that perform particular tasks or implement particular abstract data types. Computer system 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system 312 is shown in the form of a general-purpose computing device. The components of computer system 312 may include, but are not limited to, one or more processors 316, a memory 328, and a bus 318 that couples various system components including memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 312 typically includes a variety of computer system readable media. Such media may be any available media that is accessible by computer system 312, and may include both volatile and non-volatile media, removable and non-removable media.

Memory 328 may include computer system readable media in the form of volatile memory, such as random-access memory (RAM) 330 and/or cache memory 332. Computer system 312 may further include other removable/non-removable, volatile/non-volatile computer system storage media. By way of example, storage system 334 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein. For example, one or more of the program modules may include system 96 or portions thereof.

Program/utility 340 is executable by processor 316. Program/utility 340 and any data items used, generated, and/or operated upon by computer system 312 are functional data structures that impart functionality when employed by computer system 312. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 312 may also communicate with one or more external devices 314 such as a keyboard, a pointing device, a display 324, etc.; one or more devices that enable a user to interact with computer system 312; and/or any devices (e.g., network card, modem, etc.) that enable computer system 312 to communicate with one or more other computing devices. Such communication can occur via input/output (I/O) interfaces 322. Still yet, computer system 312 can communicate with one or more networks such as a local area network (LAN), a general wide area network (WAN), and/or a public network (e.g., the Internet) via network adapter 320. As depicted, network adapter 320 communicates with the other components of computer system 312 via bus 318. It should be understood that although not shown, other hardware and/or software components could be used in conjunction with computer system 312. Examples, include, but are not limited to: microcode, device drivers, redundant processing units, external disk drive arrays, RAID systems, tape drives, and data archival storage systems, etc.

While computing node 300 is used to illustrate an example of a cloud computing node, it should be appreciated that a computer system using an architecture the same as or similar to that described in connection with FIG. 3 may be used in a non-cloud computing implementation to perform the various operations described herein. In this regard, the example embodiments described herein are not intended to be limited to a cloud computing environment. Computing node 300 is an example of a data processing system. As defined herein, the term "data processing system" means one or more hardware systems configured to process data, each hardware system including at least one processor programmed to initiate operations and memory.

Computing node 300 is an example of computer hardware. Computing node 300 may include fewer components than shown or additional components not illustrated in FIG. 3 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 300 is also an example of a server. As defined herein, the term "server" means a data processing system configured to share services with one or more other data processing systems. As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

Figure 4:
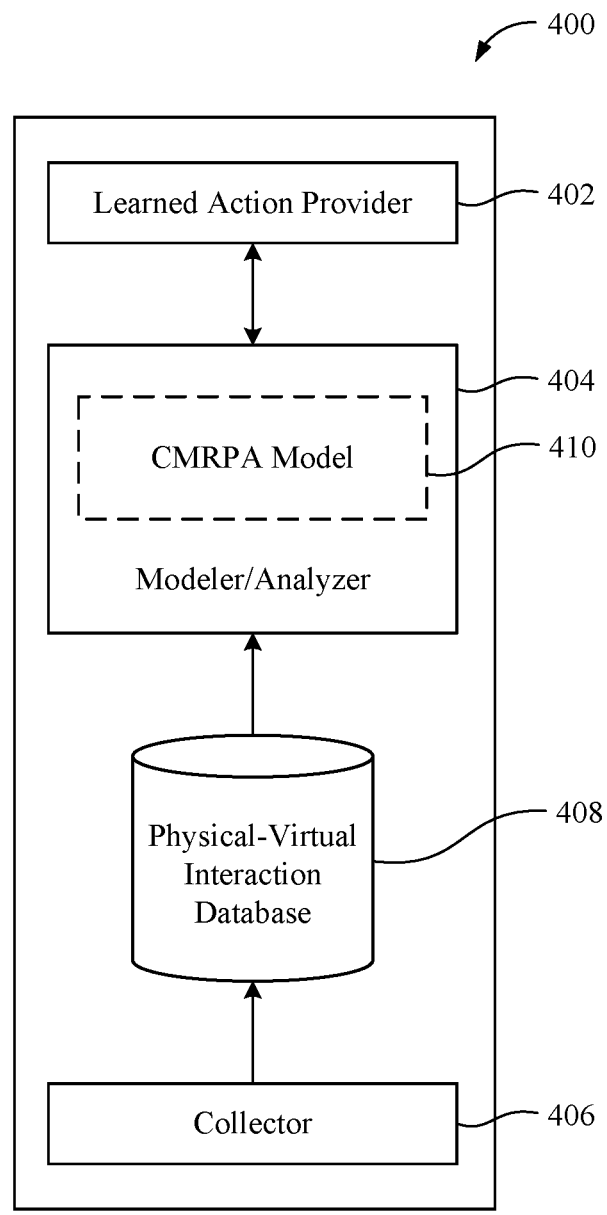
FIG. 4 depicts a system for providing learned interactions in a computer-mediated reality environment according to an embodiment of the present invention.

FIG. 4 depicts system 400, which according to one embodiment, is similar to the system for providing learned interactions 96 described with reference to FIG. 2. System 400 creates one or more learned interactions corresponding to CMR scenarios that a user encounters when interacting with a CMR environment hosted by a CMR system. A learned interaction can be provided to the user when appropriate, as determined by system 400, while the user is interacting with the CMR environment. The learned interaction corresponds to a probable physical action and, as described below, is based on a physical action identified as yielding an optimal result for the CMR scenario. The learned interaction can be an augmented learned interaction that provides the user with knowledge on how to perform the physical action identified as yielding an optimal result. Alternatively, the learned action can be an insertion of a virtual rendering of the physical action into the CMR scenario on behalf of the user.

Different users can perform physical actions differently within the same CMR scenario. An inventive aspect of system 400 is identifying different modes and/or movements for performing a physical action and determining which yields an optimal result. System 400 creates a learned interaction based on the manner or mode of performing the physical action identified as yielding the optimal result. The learned interaction can enable other users to adopt the same manner or mode when interacting with a CMR environment. System 400 is thus able to crowd-source specific skills (physical and other real-world skills) for specific tasks performed when interacting with a CMR environment. Drawing on the collective learning of a community of users of CMR systems, system 400 can leverage that learning to create learned interactions that enhance individual users' experiences interacting with a CMR environment.

System 400 can create learned interactions for different CRM scenarios presented by different CMR systems hosting different CMR environments. System 400 also can classify a user or group of users based on ascertainable characteristics of the users and can create user-specific learned interactions that are determined by the system to be well-suited for users with particular characteristics. A well-suited learned interaction can correspond to a physical action that a user with a specific characteristic is capable of performing and that is likely to yield an optimal result. A user (or group of users), for example, may be inhibited by a physical constraint that precludes or impedes the user's (or users') ability to interact with a particular CMR environment involving certain CMR scenarios. For example, based on tracking or monitoring a user's physical movements, system 400 can determine that the user is physically constrained (e.g., has not been able to bend over to retrieve an object within a CMR environment and that the condition has persisted for a determined time period, thus suggesting a persistent physical limitation).

System 400, as described below, can identify a physical action—specifically a particular manner or mode of performing the action—that, given the user's (or group of users') physical constraint, the user (or group of users) nonetheless can perform. The learned interaction is one that is likely optimal for a given CMR scenario given the physical constraint. System 400 also can create a learned interaction that is specifically crafted to compensate for a user's (or groups of users') system-identified physical constraint by modifying a physical action. The learned interaction is thus a modified physical action that, as modified, is capable of being performed by the user (or group of users). For example, a virtual reality for training a user in Brazilian jiu-jitsu may require that the user perform a hip toss on a 6-foot, 200-pound opponent. The user may only be 5 feet, 130 pounds. The system 400, based on stored knowledge of the user's physical characteristics (height and weight) acquired from prior monitoring of the user, creates a learned interaction by modifying the movements for an optimal hip toss to accommodate the user's relatively smaller size. The modifications can include adjusting the positioning and movements of the user's hips, back, and arms to enable the user to perform the hip toss in a manner that the user is able to perform. The learned interaction (as a modified physical action) is also likely optimal for a given CMR scenario given the user's specific physical constraints.

In various embodiments, system 400 operatively couples with a CMR system (e.g., virtual reality system, augmented reality system) to provide one or more learned interactions to a user interacting with a CMR environment hosted by the CMR system. System 400 thus can operate in conjunction with a CMR system hosting a CMR environment. At different times, system 400 can operate in conjunction with different CMR systems hosting different CMR environments.

System 400 illustratively includes learned interactions provider 402, analyzer/modeler 404, collector 406, and physical-virtual interaction database 408. Learned interactions provider 402, analyzer/modeler 404, and collector 406, in one embodiment, are implemented in computer system-executable instructions that execute on a computer-system processor such as processor 316 of computer system 312 described with reference to FIG. 3. Accordingly, the computer system-executable instructions for implementing learned interactions provider 402, analyzer/modeler 404, and collector 406 can reside in a memory such as memory 328 and can be conveyed to the processor via a bus such as bus 318 also described with reference to FIG. 3. A portion of the memory also can be allocated to physical-virtual interaction database 408. In other embodiments, one or more of learned interactions provider 402, analyzer/modeler 404, and collector 406 can be implemented in hardwired circuitry or as a combination of circuitry and computer system-executable instructions.

In one embodiment, system 400 is implemented within a server (e.g., cloud-based server) that hosts a CMR system (e.g., virtual reality system, augmented reality system). In another embodiment, system 400 is implemented in a client device. The client device can be a device that runs (executes computer-system executable instructions) a virtual reality application or augmented reality application. Alternatively, the client device can be a device that executes computer system-executable instructions for communicating with a CMR system that runs on a separate device (e.g., network server).

Learned interactions provider 402 creates learned interactions based on a model generated by analyzer/modeler 404 using data obtained by collector 406 and compiled in physical-virtual interaction database 408. The data comprises physical-virtual interaction data and the model is CMR-physical action (CMRPA) model 410. CMRPA model

410 is derived by the analyzing physical-virtual interaction data. Physical-virtual interaction data is data corresponding to prior physical actions performed by users during prior CRM sessions presented to users interacting with one or more CMR environments hosted by one or more CMR systems.

CMR systems, using various algorithms, can track and log with specificity user-system interactions during CMR sessions. For example, referring additionally to FIG. 5, a three-dimensional Cartesian graph 500 provides a framework for spatial mappings of a user's movements, which are tracked by a CMR system using physical controllers and haptics. System-sensed user movements can be aligned with stored data corresponding to skeletal structures to interpret the user's movements. Thus, physical-virtual interaction data corresponding to physical actions can be generated by monitoring user interactions within various CMR environments. Monitoring can be performed as server-side monitoring, in which a server that hosts a CMR environment collects and stores physical-virtual interaction data, or as client-side monitoring in which a user device collects and stores CMR system-generated data.

Physical-virtual interaction data can include motion-capture data corresponding to movements of objects (e.g., physical actions of users) in CMR scenarios. Analyzer/modeler 404 can analyze the motion-capture data to discern physical action differences yielding different outcomes and determining the features of the movements of objects that correspond to different outcomes. Using a scenario recognition algorithm, analyzer/modeler 404 can analyze terminus images and/or key frames to detect and identify objects, classify physical actions and movements, and track movements thereby identifying variations that can be used in creating a learned interaction. As described more fully below, motion-capture data can be processed by analyzer/modeler 404 using a machine learning algorithm that trains CMRPA model 410 to map collected visual data corresponding to physical actions to the results of the physical actions. CMRPA model 410 can identify outcomes likely to be optimal in CMR scenarios and determine the manner or mode of performing the physical actions that yield likely optimal outcomes.

CMRPA model 410 can be trained using machine learning to identify different virtual scenarios within various CMR environments. For the different virtual scenarios, CMRPA model 410 can associate physical actions performed by users interacting with the CMR systems that create the virtual scenarios. CMRPA model 410 correlates physical actions with results of the physical actions and, based on correlating the physical actions with the results, identifies physical actions likely to yield optimal results for users interacting with CMR systems. Learned interactions for specific CMR scenarios are created by learned interactions provider 402 based on the mode or manner of performing the physical actions identified as likely to yield optimal results.

The optimality of a CMR scenario outcome can be determined from numerical results generated by the particular CMR system itself, as, for example, with virtual reality games in which a user's performance of physical actions results in a score (e.g., the lowest score for a virtual round of golf is optimal). Other CMR systems, too, can yield numerical determinations, such as a virtual typing system that automatically grades performance based on the number of words per minute that the user types. System 400 also can be constructed to determine the optimality of CMR scenario results generated by physical actions based on subjective evaluations. For example, with certain CMR systems, optimality can be determined by consensus. A user's performance in a virtual reality ballet, for example, may be judged by other users who express their opinions on a social platform shared by various users of the virtual reality system. For example, among different modes of performance by different users-as-performer, the one receiving the most "likes" or greatest number of positive evaluations of the manner of performance can be determined the optimal outcome or result of the underlying physical action. Other mechanisms for determining optimality of CMR scenario outcomes or results of physical actions in a CMR scenario, whether determined objectively or subjectively, can be readily envisioned by one skilled in the art.

The physical-virtual interaction data used to derive CMRPA model 410 can be obtained by collector 406 from various networked sources. Physical-virtual interaction data corresponding to a specific CMR system can be electronically retrieved by collector 406 from the CMR system (e.g., server-side monitoring) or from a user device (e.g., client-side monitoring) used to interact with the CMR system. CMR system users may make physical-virtual interaction data available, for example, by sharing the data on social networking platforms. Optionally, system 400 can incorporate incentives for users to provide physical-interaction data. In different embodiments, for example, various gamification techniques can be incorporated in system 400 to incentivize sharing of physical-interaction data (e.g., posting to a leaderboard names and current scores of leading competitors in a virtual golf tournament). Collector 406 communicatively couples with different sources via different network connections (e.g., the Internet) to collect publicly accessible or user-published physical-virtual interaction data. The physical-virtual interaction data is compiled in physical-virtual interaction database 408.

Learned interactions need not be created for all types of users or for all CRM scenarios presented in a CMR environment by a CMR system. Certain constraints on specific hardware may limit the number of CMR scenarios for which learned interactions can be provided. For example, the central processing unit (CPU) of a particular device may only be capable of rendering five CMR scenarios simultaneously without affecting the frame rate to an extent that adversely impacts users' perceptions. Accordingly, in one embodiment, system 400 may limit the provisioning of learned interactions to a specific number of CMR scenarios.

Relatedly, in one embodiment, analyzer/modeler 404 also can determine which of the many CMR sessions created by various CMR systems warrant analyzing for possibly creating corresponding learned interactions. For example, a user completing a virtual update of a VR document which the user's particular physical movements (or other mode of action) improves the overall speed of changes within a scenario can trigger a system-generated indication of the potential benefit of analyzing the scenario and sharing the physical movement with other users updating the VR document. Analyzer/modeler 404, in one embodiment, can make the determination by analyzing historical data with respect to a specific user or group of users. Historical data can include, for example, explicit or implicit feedback that a CMR session met or did not meet a user's expectations, which may be due to a user-specified physical constraint. In some instances, the absence of user feedback can itself be useful information. For example, based on historical data, certain users usually provide feedback (e.g., "the mountain walk scenario did/did not meet expectations and exhibited high quality"), and the absence of expected feedback may indicate that the users were unable to interact with the CMR scenario due to a physical or other constraint. The implication, therefore, is that the user (or class of users) so constrained can benefit by being providing a learned interaction. As an augmented physical action, the learned interaction can provide information for performing a physical action that the user is capable of performing and likely to yield an optimal result. As a physical action substitution, the learned action can be inserted into the scenario on behalf of the user to substitute for an action that the user is unable to perform.

To determine which CMR sessions created by various CMR systems warrant analyzing for possibly creating corresponding learned interactions, analyzer/modeler 404 also can analyze historical data to determine a statistical likelihood that a specific physical action, given a user's physical constraint, may result in the user having a negative experience interacting with a specific CMR environment. For example, for a specific user (or group of users) interacting in a particular CMR scenario, analyzer/modeler 404 may determine there is a high probability that the interacting may cause injury to the user or other effect that degrades a user's experience. Analyzer/modeler 404 also can compare interactions of multiple users based on social affinity data extracted from a social graph or social network platform. Based on an affinity score (e.g., a score greater than a predetermined threshold), the physical-virtual interaction data for one user may be applied to a similar user engaged in a similar physical activity within the same or a sufficiently similar CMR environment.

More generally, real-time monitoring of, or data collected from recordings of, CMR sessions can generate physical-virtual interaction data that are used by analyzer/modeler 404 to surface indicators for which CMR scenarios warrant analyzing for possibly creating corresponding learned interactions. Indicators can include, for example, a measure of similarity between different CMR environments, the context of specific physical interactions, timing of interactions, and other factors. The factors can be used to associate specific users, or groups of users, with specific physical actions in the context of specific CMR scenarios of CMR environments. Collected user feedback and/or historical data also can be used by analyzer/modeler 404 to determine which class of users with respect to which CMR scenarios learned interactions are statistically likely to benefit from provision of learned interaction.

In creating the learned interactions, learned interactions provider 402 utilizes CMRPA model 410 derived by analyzer/modeler 404 using physical-virtual interaction data collected by collector 406 and compiled in physical-virtual interaction databased 408. CMRPA model 410 can be constructed to determine whether and, if so, which of different learned interactions to provide to a user, the determination based on input indicating features such as the CMR environment with which the user is interacting and identifiable characteristics of the user.

CMRPA model 410, in one embodiment, is trained to make the determinations by classifying inputs to the model. CMRPA model 410 can be trained using machine learning to classify inputs to the model. A particular classification can dictate whether and, if so, which learned interaction is provided to a user by learned interactions provider 402 when the user is interacting in a specific CMR scenario of a CMR environment. Different machine learning algorithms can be used to train CMRPA model 410, the algorithms using training data (a set of appropriately labeled feature vectors) to produce a function $f: \mathbb{R}^n \rightarrow \{1, \ldots, k\}$ that assigns an input (feature vector x) to a category identified by numeric code $y=f(x)$. In one embodiment, the CMRPA model 410 is constructed as an artificial neural network (ANN).

Figure 6:
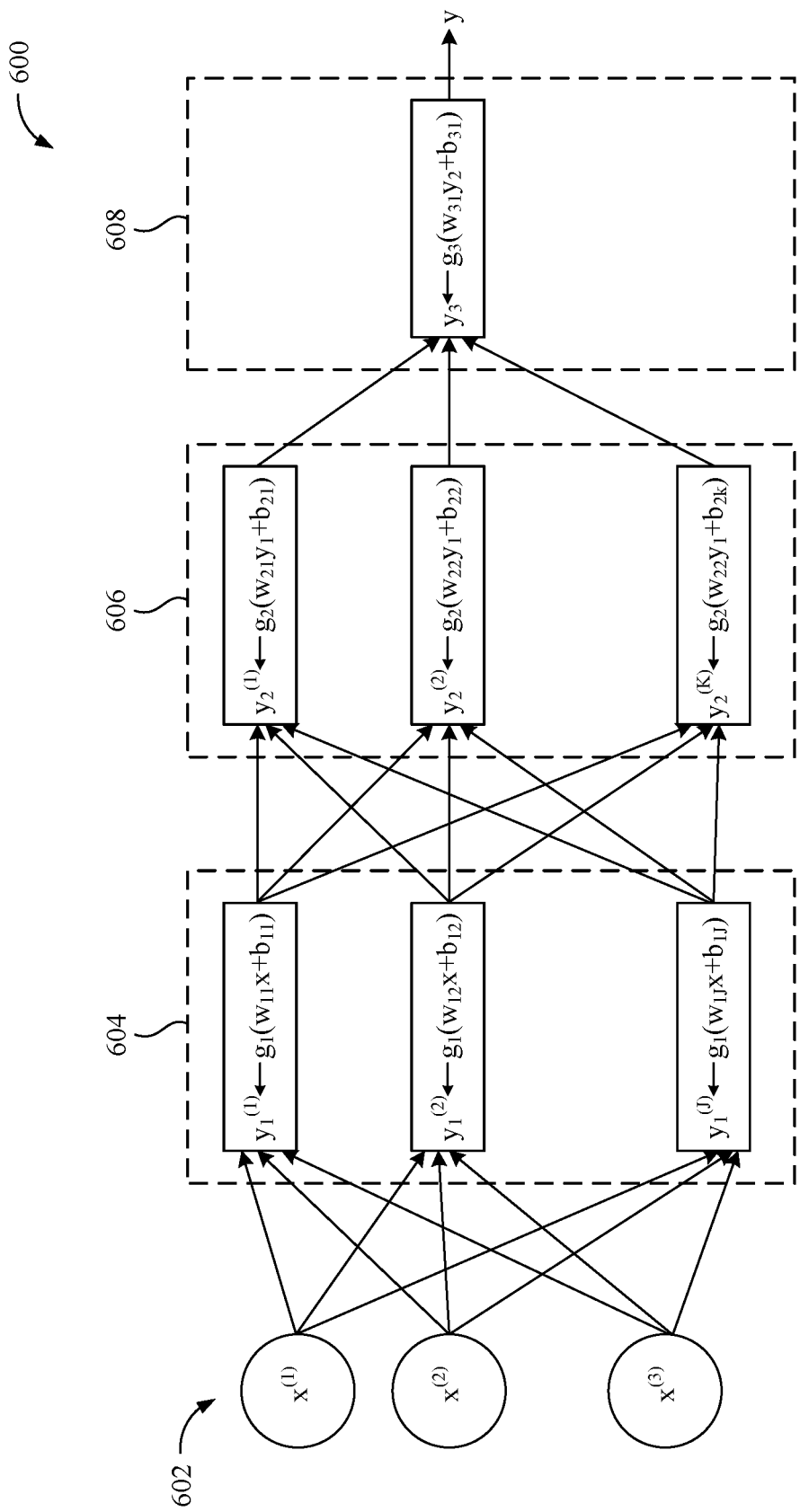
FIG. 6 is a representative artificial neural network used by a system for providing learned interactions in a computer-mediated reality environment according to an embodiment of the present invention.

FIG. 6 depicts ANN 600, a representative multi-layer ANN. Illustratively, ANN 600 comprises input layer 602, first hidden layer 604, second hidden layer 606, and output layer 608. In other embodiments more or fewer hidden layers can be used to construct ANN 600. ANN 600, trained using machine learning, classifies a feature vector $x_i=(x_i^{(1)}, x_i^{(2)}, \ldots x_i^{(j)})$, where $x_i^{(j)}$ is the j-th feature of the i-th feature vector, presented as input. Each unit of first hidden layer 604 applies a linear transformation, $(w_{ij} \cdot x_i + b_{ij})$, to each input feature vector and then applies an activation function, $g_i$, (e.g., a non-linear function such as hyperbolic tangent, tanh, or normalized exponential, softmax) to each linearly transformed value, yielding $y_i^m \leftarrow g_i(w_{ij} \cdot x + b_{ij})$. The transformed output of first hidden layer 604 is then input to second hidden layer 606, which also applies linear transformation to the input and then applies to the transformed result an activation function. The output of second hidden layer 606 is input to output layer 608, which likewise applies a linear transformation and inputs the result into an activation function yielding $y_i^m \leftarrow g_i(w_{ij} \cdot y_j + b_{iy})$, a value indicating a classification or category of the input feature vector, $x_i$.

Through successive iterations of the process of classifying a set of training data (correctly labeled featured vectors), the weight vectors, $w_{ij}$, are updated by applying the backpropagation algorithm (essentially a feedback process) until ANN 600 is able to classify the labeled feature vectors with an acceptable level of accuracy. Once trained, ANN 600 can classify unlabeled feature vectors $x_i$ with a certain level of confidence. The features $x^{(i)}$ of each feature vector $x_i$ correspond, for example, to features related to CMR environments and to user characteristics. CMRPA model 410 can classify users and groups of users (e.g., based on physical constraints), as well as specific physical actions required with specific CMR interactions.

CMRPA model 410, in one embodiment, can be trained using physical-virtual interaction data obtained by monitoring physical actions performed by at least one other user while interacting with the CMR environment or a different CMR environment hosted by a different CMR system, identifying results of the physical actions, and generating the physical-virtual interaction data corresponding to the physical actions and the results of the physical actions. In different embodiments, other machine learning techniques can be used for providing a similar classification capability to CMRPA model 410.

CMRPA model 410 can be trained to ascertain that a user or group of users exhibit certain physical actions interacting with a CMR environment, the physical actions having a significant causal impact on the outcome of the interaction. These physical actions can be aggregated as when, for example, similar CMR scenarios arise in different CMR environments and are acted on differently by different users. Because the scenarios are similar, an optimal physical action can be determined by analyzing outcomes resulting from different physical actions by different users, based on which, the physical action that provides the optimal result can be identified. CMRPA model 410 can be trained to identify circumstances in which presenting a learned interaction, whether augmented physical action or physical action substitution, to a user is probabilistically likely to enhance the user's experience interacting with a similar CMR scenario. CMRPA model 410 can be trained to identify circumstance based a user's physical activity constraints (e.g., tracking reveals the user has been unable for an extended period of time to bend over to retrieve objects on the ground), as well as the probable physical action required in interacting with CMR environment and the duration of the probable physical action.

Figure 5:
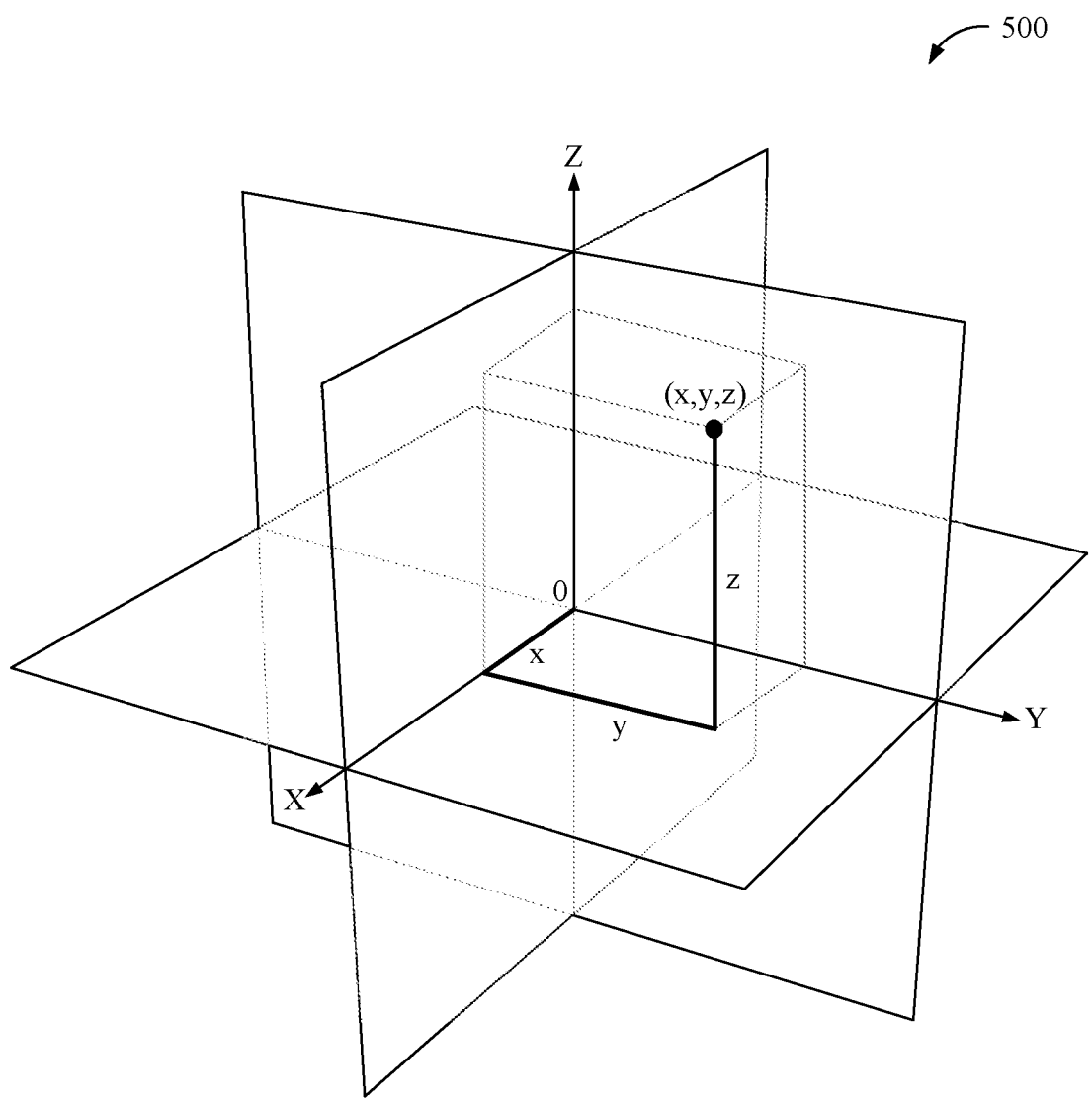
FIG. 5 is an example framework of spatial mappings used with a system for providing learned interactions in a computer-mediated reality environment according to an embodiment of the present invention.

Operatively, once potential scenarios are identified during a CMR session by CMRPA model 410, the model determines probable physical actions of a user interacting with the CMR environment in which potential scenarios arise. Based on client-side and/or server-side monitoring of a user's or users' prior interactions with the same or a similar CMR environment during earlier sessions, analyzer/modeler 404 can determine the probabilities of probable physical actions. Potential physical actions can be identified by scenario topic and the probability of performing the action at a specific time or point during interaction within the CMR environment can be determined. For example, the following pseudo code pertains to a probable physical action whose topic is performing a hip toss on an opponent in a virtual reality Brazilian jiu-jitsu tournament:

```
{
    "Action Scenario": "perform hip toss on opponent";
    "move1": "left leg x+4y−2z+8";
    "move2": "right leg/hip x+9y+12z+3";
    "move3": "right arm x+6y−2z+18";
    "Response_Time": "102";
    "Probability": ".801";
},
```

Where x, y, and z are the coordinates of a three-dimension Cartesian coordinate system (see FIG. 5). For each probable action, CMRPA model 410 infers a dependence, or correlation, between the probable action and an optimal input (mode or manner) of performing the probable action. Learned interactions provider 402 can provide a learned interaction corresponding to the optimal input, either as an augmented learned interaction or as a learned interaction substitution inserted into the CMR scenario. Learned interactions provider 402 provides a learned interaction corresponding to probable physical action if the potential action is sufficiently likely to be performed within the CMR scenario. For example, learned interactions provider 402 provides a learned interaction for a probable physical action having a probability greater than a predetermined threshold (e.g., 0.800 or 80% probability).

Analyzer/modeler 404 applies a statistical analysis (e.g., linear regression, quadratic regression) to infer dependence between the probable physical actions during a CMR session and an optimal user input. Based on the statistical analysis, CMRPA model 410 can determine a statistical relationship between the users' aggregated physical movement and a CMR session end state, that is, the outcome or result of the CMR session.

A measure of the dependence on physical action and CMR scenario outcome is the correlation computed as part of the statistical analysis. CMRPA model 410 can correlate physical actions with observed results of the physical actions in a CMR environment and, based on the correlations, identify an optimizing physical action from among multiple physical actions of users within particular CMR environments. The optimizing physical action is an action most likely to generate an optimizing result in the CMR environment. Thus, if in a given CMR scenario, different modes of action produce different outcomes, CMRPA model 410 can identify one that produces the best result for a user. An optimum result, as described above, can be determined based on user feedback or directly observable results of user interactions within a CMR environment and can be used to construct CMRPA model 410 by providing, as also described above, the training examples (feature vectors) used to train ANN 600.

CMRPA model 410, using results of the statistical analysis as input, can ascertain whether a learned interaction is appropriate for a user interacting in a particular CMR environment even though, for example, the CMR environment may be one that runs on a different code platform than that on which one or more CMR environments used to derive statistical results run. The provisioning of learned interactions can be based, at least in part, on previous user exception handling of learned interactions provided, for example, to a user with a specific physical constraint. Provisioning can also be managed, for example, based on a system-determined expected time of CMR environment interaction. For example, the user may be expected to experience a scenario only briefly (e.g., 3 seconds). Accordingly, the CMRPA model 410 can yield a $y_j$ value that prompts the learned interactions provider 402 to inject into the CMR scenario a learned interaction substitution rather than providing an augmented learned interaction to the user.

Learned interactions provider 402 can tag learned interactions corresponding to probable physical actions and place the learned interactions in a queue. Learned interactions provider 402 can provide an appropriate learned interaction, drawn from the queue, at a specific point or moment in time based on results generated by CMRPA model 410 during a CMR session.

Based on classifications determined by CMRPA model 410, learned interactions provider 402 can modify learned interactions for users likely to be physically constrained. The classification can be based, for example, on a user's prior activities or a user's membership in a specific cohort group (e.g., a community of users who share the same or similar physical constraint).

CMRPA model 410 can be generated as part of wider social cohort model. Accordingly, system 400 can be applied to any number of CMR scenarios. For example, two users may be or have engaged in statistically similar scenarios. Similarity can be determined using different statistical techniques as well as machine learning (e.g., supervised machine learning). Although the scenarios are similar, the users may perform physical actions involving the scenarios dissimilarly. The differences in performing the physical actions can result in significantly different scenario outcomes. Learned interactions provider 402 can provide a learned interaction based on the physical action identified as yielding the better of the dissimilar outcomes. Analyzer/modeler 404, as described above, can analyze physical-interaction data to discern the differences yielding different outcomes and determine the features that correspond to the better of the outcomes. The analysis can include capturing images of the underlying related physical-virtual interactions. Terminus images and/or key frames can be analyzed using scenario recognition algorithms that detect and identify objects, classify physical actions and movements, and track movements to identify variations that can be used in creating a learned interaction. In creating the learned interaction, analyzer/modeler 404 can determine based on statistical analysis the likely timing of phases within the CMR scenario for which the learned interaction is provided. Based on the result, learned interactions provider 402 can provide an augmented physical action or insert a physical action substitution at the appropriate point or time in the scenario. Optionally, the learned interaction can be provided to a user with an actionable user-interface (UI) cue.

Operating in conjunction with a CMR system, system 400 can identify a CMR environment with which a user is interacting. The CMR environment can be identified to system 400 by the CMR system hosting the CMR environment or by the user. System 400, knowing the identity of the CMR environment, can identify one or more CMR scenarios. For one or more of the CMR scenarios, system 400 can determine a probable physical action of the user interacting with the CMR environment. In one embodiment, analyzer/modeler 404 of system 400 determines the probable physical action based on analyzing prior users' interactions with CMR scenarios of the CMR environment. In another embodiment, where the CMR scenarios are obtained from a separate database (e.g., hosted by the CMR system), analyzer/modeler 404 can associate probable physical actions with the CMR scenarios based on prior analyses of other CMR scenarios. The other CMR scenarios are ones determined by CMRPA model 410 to be statistically similar to those presented in CMR environment with which a user is interacting.

Learned interactions provider 402 can provide a learned interaction corresponding to the probable physical action in response to determining based on CMRPA 410 a statistical likelihood of benefiting the user by providing the learned interaction. The likelihood can be determined based on one or more identified characteristics of the user. The one or more characteristics, in one embodiment, are determined by monitoring the user's physical performance in prior interactions. In another embodiment, the user may self-identify to system 400 as having one or more characteristics. In which case, CMRPA 410 can, based on analyses of a cohort group of users having similar characteristics, classify the user in a class likely to benefit by being provided a learned interaction.

An identified characteristic can be, for example, a physical limitation, identified to system 400 by the user or identified by the system through observing the user interact with the same or similar CMR environments. A physical limitation may in some way restrict the user's freedom of action If system 400 determines, given the CMR environment the user is interacting with, that a probable physical action involves movements the user may not be able to perform, then there is a high likelihood the user will benefit by being provided a leaned interaction that can be performed by the user. In other cases, the system-observed or user-identified characteristic can be high rate of sub-optimal performances with respect to a specific CMR scenario or class of CMR scenarios. For example, a user may have achieved a sub-optimal outcome in the previous x number of times. If x exceeds a predetermined threshold (e.g., x>5), then system 400 determines the user will benefit by being provided a leaned interaction in order to adopt a different mode or manner of interacting. CMRPA model 410 is able to classify users, based on one or more characteristics, and identify corresponding learned interactions for benefiting the users according to the users' classification.

Figure 7:
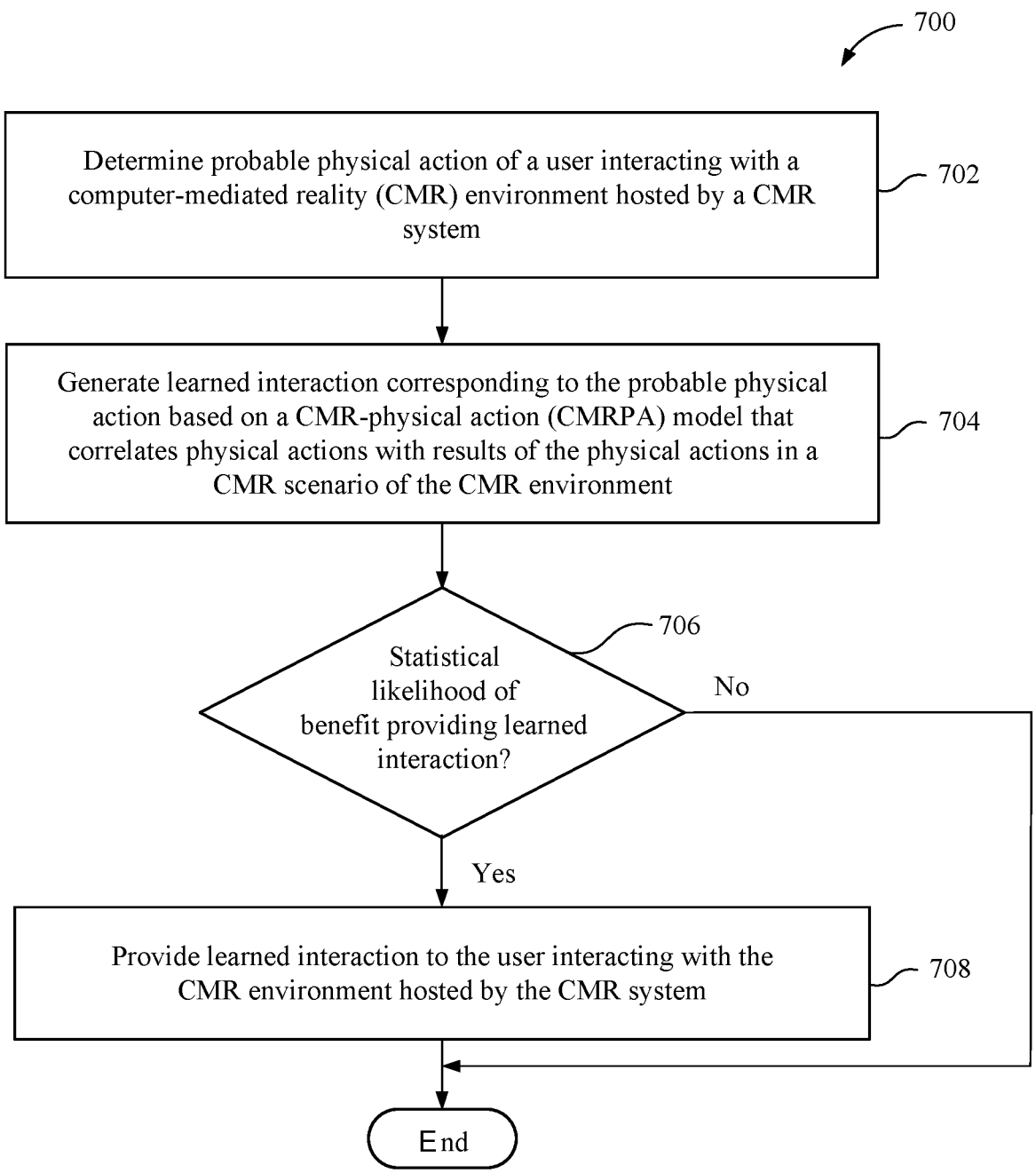
FIG. 7 is a flowchart of a method for providing learned interactions in a computer-mediated reality environment according to an embodiment of the present invention.

FIG. 7 is a flowchart of method 700 for providing learned interactions, according to one embodiment. Method 700 can be performed by a system the same or similar to any of the systems described with reference to FIGS. 1-6. The method can begin with the system determining at 702 a probable physical action of a user interacting with a CMR environment hosted by a CMR system. At 704 the system generates a learned interaction corresponding to the probable physical action. The learned interaction is generated based on a CMR-physical action (CMRPA) model that correlates physical actions with results of the physical actions in a CMR scenario of the CMR environment.

Based on at least one identified characteristic of the user, the system determines at 706 whether there is a statistical likelihood of benefiting the user by providing the learned interaction. The learned interaction is provided to the user at 708 in response to determining that there is a statistical likelihood of benefiting the user by providing the learned interaction.

The learned interaction, in one embodiment, can be generated based on a physical action that is determined by a CMRPA model to likely provide an optimal result when performed during a CMR scenario of the CMR environment. The CMRPA model, based on correlating the physical actions with the results, identifies the physical action likely for providing the optimal result.

The CMRPA model, in another embodiment, can be trained using physical-virtual interaction data obtained by monitoring physical actions performed by at least one other user while interacting with the CMR environment or a different CMR environment hosted by a different CMR system identifying results of the physical actions, and generating the physical-virtual interaction data corresponding to the physical actions and the results of the physical actions. Machine learning can be used to train the CMRPA model. In one embodiment, the CMRPA is trained using machine learning as an artificial neural network.

The learned interaction presented to the user can be an augmented physical action. As an augmented physical action, the learned interaction provides the user with knowledge (e.g., description, annotated images, video segment) on how to more optimally perform an action within a CMR scenario that requires a physical action (input) from the user. Alternatively, the leaned interaction can be a physical action substitution (e.g., computer-system instructions that when executed generate a CMR scenario outcome). As a physical action substitution, the learned interaction can be inserted into a CMR scenario in lieu of the user performing a particular physical action if the user, for whatever reason, cannot or will not perform the action but nonetheless wishes to continue interacting with the CMR environment.

One or more identified characteristics of the user can be determined by analyzing prior activity of the user interacting with the CMR environment or another CMR environment hosted by another CMR system. In one embodiment, the one or more identified characteristics of the user is a physical limitation of the user. Accordingly, the learned interaction generated corresponds to a physical action the user is capable performing, as determined by the CMRPA model.

Figure 8:
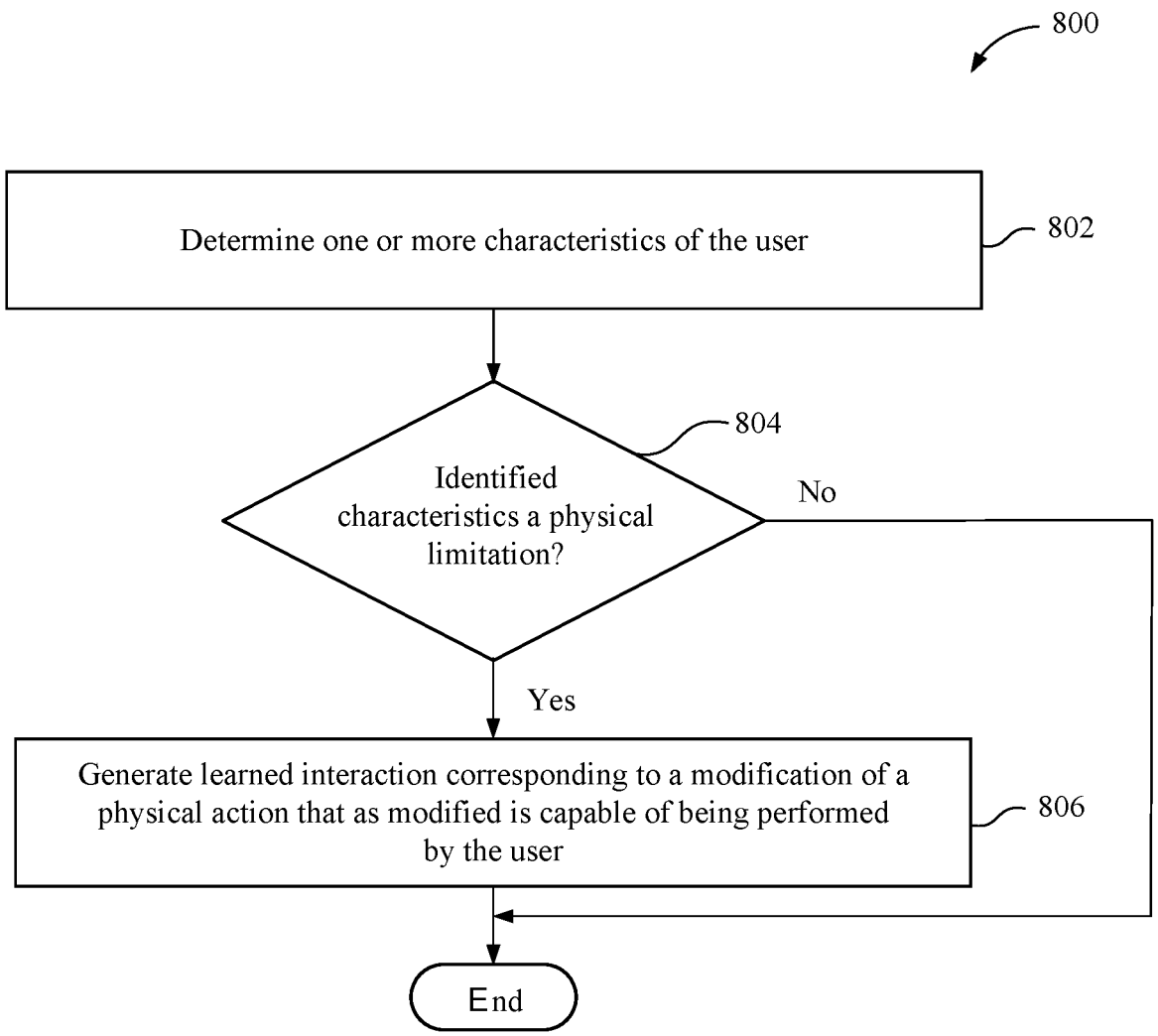
FIG. 8 is a flowchart of a method for providing learned interactions in a computer-mediated reality environment according to an embodiment of the present invention.

Referring additionally to FIG. 8, in one embodiment, the system after determining one or more characteristics of the user at 802, determines at 804 whether an identified characteristic is a physical limitation of the user. In response to determining that the identified characteristic is a physical limitation of the user, the system generates 806 a learned interaction corresponding to a modified physical action that as modified is capable of being performed by the user.

The terminology used herein is for the purpose of describing particular embodiments only and is not intended to be limiting. Notwithstanding, several definitions that apply throughout this document now will be presented.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the terms "if" and "when" are to be construed as "in response to" or "responsive to," depending upon the context. Thus, the phrases "if it is determined" and "when [a stated condition or event] is detected" are to be construed to mean "in response to determining [the stated condition or event]" or "responsive to detecting [the stated condition or event]," depending on the context.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the terms "run," "runs," and "running" mean the execution or executing of computer-system executable instructions by a processor of the computer-system.

As defined herein, the term "output" means storing in physical memory elements, e.g., devices, writing to display or other peripheral output device, sending or transmitting to another system, exporting, or the like.

As defined herein, the term "processor" means at least one hardware circuit configured to carry out instructions. The instructions may be contained in program instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real-time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   determining, using computer hardware, a probable physical action of a user interacting with a computer-mediated reality (CMR) environment hosted by a CMR system;
   generating, using the computer hardware, a learned interaction corresponding to the probable physical action based on a CMR-physical action (CMRPA) model that correlates physical actions with results of the physical actions in a CMR scenario of the CMR environment; and
   providing, using the computer hardware, the learned interaction corresponding to the probable physical action in response to determining, based on at least one identified characteristic of the user, a statistical likelihood of benefiting the user by providing the learned interaction.

2. The method of claim 1, wherein the learned interaction is generated based on a physical action that is determined by a CMR-physical action (CMRPA) model to likely provide an optimal result when performed during a CMR scenario of the CMR environment, and wherein the CMRPA model correlates physical actions with results of the physical actions in the CMR environment and, based on correlating the physical actions with the results, identifies the physical action for likely providing the optimal result.

3. The method of claim 1, wherein the learned interaction comprises one of an augmented physical action corresponding to the probable physical action and a physical action substitution corresponding to the probable physical action.

4. The method of claim 1, wherein the at least one identified characteristic is determined by analyzing prior activity of the user interacting with the CMR environment or another CMR environment hosted by another CMR system.

5. The method of claim 1, wherein the at least one identified characteristic is a physical limitation of the user, and wherein the learned interaction corresponds to a physical action capable of being performed by the user.

6. The method of claim 1, wherein the at least one identified characteristic is a physical limitation of the user, and wherein the learned interaction corresponds to a modified physical action that as modified is capable of being performed by the user.

7. The method of claim 1, wherein the CMRPA model is trained using physical-virtual interaction data obtained by monitoring physical actions performed by at least one other user while interacting with the CMR environment or a different CMR environment hosted by a different CMR system, identifying results of the physical actions, and generating the physical-virtual interaction data corresponding to the physical actions and the results of the physical actions.

8. A system, comprising:
a processor configured to initiate operations including:
determining a probable physical action of a user interacting with a computer-mediated reality (CMR) environment hosted by a CMR system;
generating, using the computer hardware, a learned interaction corresponding to the probable physical action based on a CMR-physical action (CMRPA) model that correlates physical actions with results of the physical actions in a CMR scenario of the CMR environment; and
providing a learned interaction corresponding to the probable physical action in response to determining, based on at least one identified characteristic of the user, a statistical likelihood of benefiting the user by providing the learned interaction.

9. The system of claim 8, wherein the learned interaction is generated based on a physical action that is determined by a CMR-physical action (CMRPA) model to likely provide an optimal result when performed during a CMR scenario of the CMR environment, and wherein the CMRPA model correlates physical actions with results of the physical actions in the CMR environment and, based on correlating the physical actions with the results, identifies the physical action for likely providing the optimal result.

10. The system of claim 8, wherein the learned interaction comprises one of an augmented physical action corresponding to the probable physical action and a physical action substitution corresponding to the probable physical action.

11. The system of claim 8, wherein the at least one identified characteristic is determined by analyzing prior activity of the user interacting with the CMR environment or another CMR environment hosted by another CMR system.

12. The system of claim 8, wherein the at least one identified characteristic is a physical limitation of the user, and wherein the learned interaction corresponds to a physical action capable of being performed by the user.

13. The system of claim 8, wherein the at least one identified characteristic is a physical limitation of the user, and wherein the learned interaction corresponds to a modified physical action that as modified is capable of being performed by the user.

14. A computer program product comprising a non-transitory computer readable storage medium having program instructions embodied therewith, the program instructions executable by a processor to cause the processor to initiate operations comprising: determining, by the processor, a probable physical action of a user interacting with a computer-mediated reality (CMR) environment hosted by a CMR system; generating, using the computer hardware, a learned interaction corresponding to the probable physical action based on a CMR-physical action (CMRPA) model that correlates physical actions with results of the physical actions in a CMR scenario of the CMR environment; and providing, by the processor, a learned interaction corresponding to the probable physical action in response to determining, based on at least one identified characteristic of the user, a statistical likelihood of benefiting the user by providing the learned interaction.

15. The computer program product of claim 14, wherein the learned interaction is generated based on a physical action that is determined by a CMR-physical action (CMRPA) model to likely provide an optimal result when performed during a CMR scenario of the CMR environment, and wherein the CMRPA model correlates physical actions with results of the physical actions in the CMR environment and, based on correlating the physical actions with the results, identifies the physical action for likely providing the optimal result.

16. The computer program product of claim 14, wherein the learned interaction comprises one of an augmented physical action corresponding to the probable physical action and a physical action substitution corresponding to the probable physical action.

17. The computer program product of claim 14, wherein the at least one identified characteristic is determined by analyzing prior activity of the user interacting with the CMR environment or another CMR environment hosted by another CMR system.

18. The computer program product of claim 14, wherein the at least one identified characteristic is a physical limitation of the user, and wherein the learned interaction corresponds to a physical action capable of being performed by the user.

19. The computer program product of claim 14, wherein the at least one identified characteristic is a physical limitation of the user, and wherein the learned interaction corresponds to a modified physical action that as modified is capable of being performed by the user.

20. The computer program product of claim 14, wherein the CMRPA model is trained using physical-virtual interaction data obtained by monitoring physical actions performed by at least one other user while interacting with the CMR environment or a different CMR environment hosted by a different CMR system, identifying results of the physical actions, and generating the physical-virtual interaction data corresponding to the physical actions and the results of the physical actions.

* * * * *